United States Patent [19]

Donnelly

[11] 4,078,818
[45] Mar. 14, 1978

[54] CONVERTIBLE FLATBED TRUCK

[76] Inventor: Frank R. Donnelly, 18 Burton La., Rockaway, N.J. 07866

[21] Appl. No.: 772,261

[22] Filed: Feb. 25, 1977

[51] Int. Cl.² ............................................. B60P 3/42
[52] U.S. Cl. ................................ 280/415 B; 214/515; 214/DIG. 12; 212/8 R; 214/77 R
[58] Field of Search ................ 214/515, 75 H, 517; 280/415 R, 415 A, 415 B, 438; 296/35 A; 212/8 R

[56] References Cited

U.S. PATENT DOCUMENTS

| 2,151,640 | 3/1939 | Menning | 296/35 A |
| 2,672,990 | 3/1954 | Sundin | 214/75 H |
| 2,682,957 | 7/1954 | Holmes | 214/DIG. 12 |
| 2,776,761 | 1/1959 | Lovelace | 214/75 H |
| 2,807,477 | 9/1957 | Tuso, Jr. | 280/438 R X |
| 3,092,367 | 6/1963 | Selby | 214/DIG. 12 |

FOREIGN PATENT DOCUMENTS

| 690,541 | 4/1953 | United Kingdom | 280/415 B |

Primary Examiner—Albert J. Makay
Attorney, Agent, or Firm—Marvin A. Naigur

[57] ABSTRACT

A convertible vehicle is provided in which a flatbed unit can be used to convert a tractor into a flatbed truck when the tractor is not used for towing a trailer unit.

7 Claims, 7 Drawing Figures

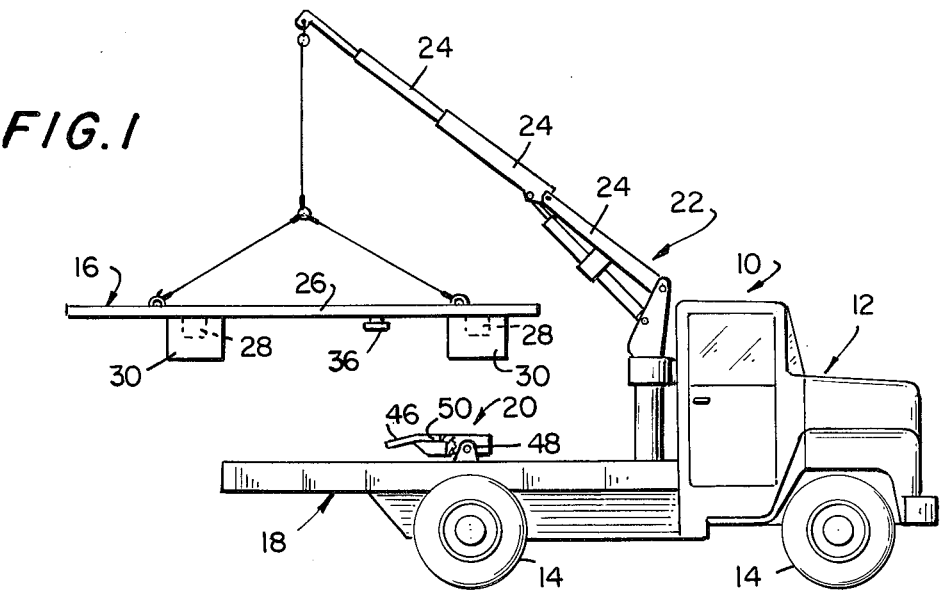
FIG.1
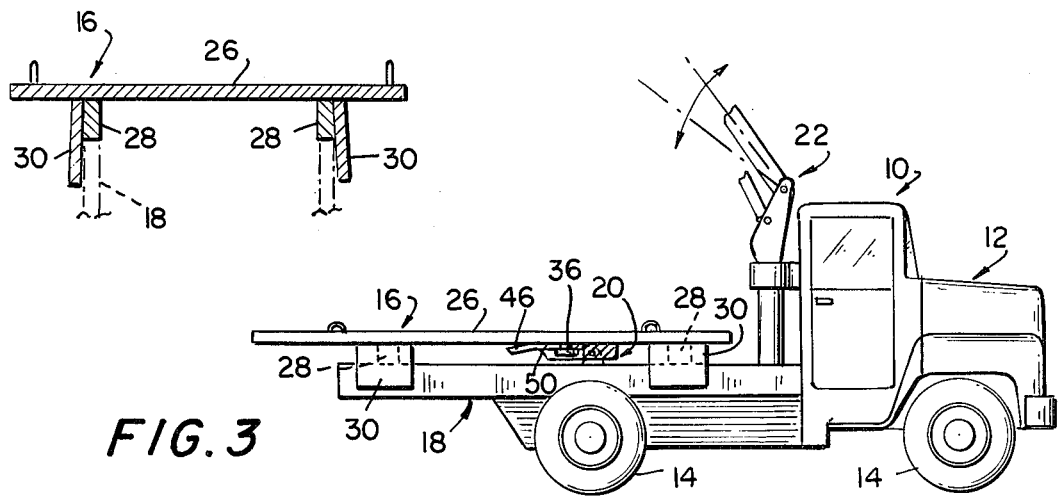
FIG.2
FIG.3
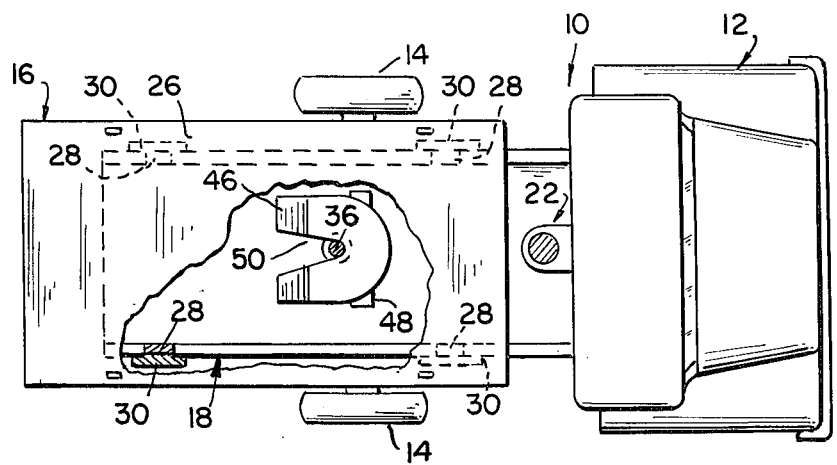
FIG.4

CONVERTIBLE FLATBED TRUCK

BACKGROUND OF THE INVENTION

In connection with the operation of large semitrailer trucks, the tractor unit is used to transport the trailer unit to a distant point. When the trailer unit has been delivered, the tractor unit does not become a useful work vehicle, unless there is another trailer available which is to be transported. With the development of the portable flatbed unit of the present invention, after a trailer has been delivered, it is possible to convert the tractor unit into a flatbed truck. Accordingly, when the semi-trailer truck has reached its destination and the trailer has been disembarked, it is possible to convert the vehicle to a flatbed truck either for local hauling or long distance hauling. In this manner, the likelihood of a tractor unit having to be transported a long distance without a load is substantially diminished.

SUMMARY OF THE INVENTION

In accordance with the illustrative embodiments demonstrating features and advantages of the present invention, there is provided a convertible vehicle. A wheel supported tractor is provided which is capable of interconnection with a flatbed unit. The tractor unit is provided with a fifth wheel coupler which is formed with a slot. A pin is mounted downwardly on the flatbed unit, such that the pin can be received in the slot for connecting and disconnecting the flatbed unit from the tractor unit. Thus, the vehicle can be converted into either a flatbed truck or a semi-trailer truck.

BRIEF DESCRIPTION OF THE DRAWINGS

The above brief description, as well as further objects, features, and advantages of the present invention, will be more fully appreciated by reference to the following detailed description of presently preferred but nonetheless illustrative embodiments in accordance with the present invention, when taken in connection with the accompanying drawings wherein:

FIG. 1 is a side elevational view of the present invention showing the flatbed unit positioned above the trailer unit prior to connection;

FIG. 2 is a transverse sectional view of the flatbed unit, showing the struts which engage the rails of the trailer unit;

FIG. 3 is a side elevational view of the vehicle shown in FIG. 1, with the flatbed unit mounted on the trailer and part of the flatbed is broken away to show the connection through the fifth wheel coupler;

FIG. 4 is a plan view of the vehicle shown in FIG. 1 with portions of the flatbed broken away to show the mounting arrangement;

DESCRIPTION OF THE PREFERRED EMBODIMENTS

Figure 5:
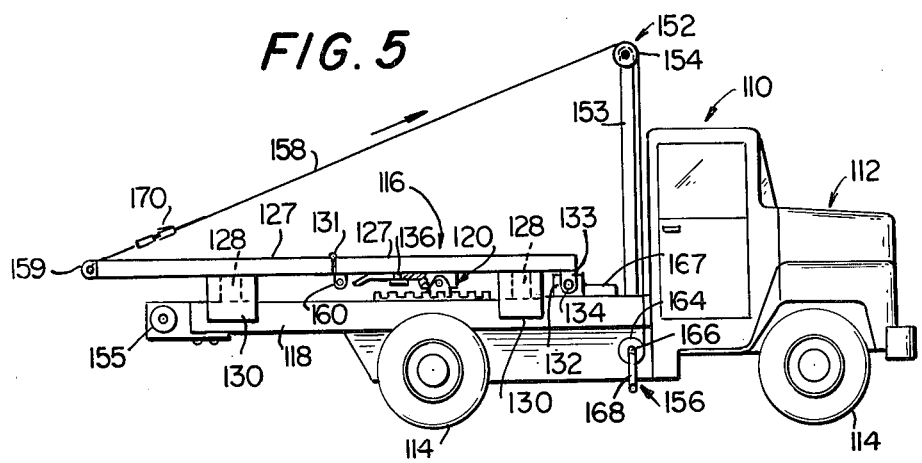
FIG. 5 is a side elevational view of another embodiment of the present invention in which the completely removable flatbed of FIG. 1 is replaced with a hinged flatbed and pulley system, with the flatbed unit positioned on the trailer prior to removal.

With reference to FIG. 1, there is shown a convertible flatbed truck, generally designated by the reference numeral 10. The flatbed truck 10 includes a tractor unit 12, supported by the wheels 14, and a flatbed unit 16. The tractor unit 12 has a frame 18 on which there is mounted a conventional fifth wheel coupler 20.

A folding crane 22 is mounted on the frame 18 for mounting and removing the flatbed 16. It should be noted that folding crane 22 could also be used for other purposes, such as for loading and unloading the truck 10. The folding crane 22 is provided with three hinged arms 24, which can be folded into a stored position so as not to interfere with the operation of the truck 10.

As best shown in FIG. 2, the flatbed unit 16 comprises a single-unit bed section 26, supported by four shim blocks 28 which are mounted at the corner areas of bed section 26 and positioned to rest on the members of frame 18. Guide plates 30 are mounted on shim blocks 28 and a king pin 36 is secured to the bottom of bed section 26. It is preferable that the bed section 26 be fabricated with a width dimension of eight feet and with the guide plates 30 spaced 34 inches apart, to conform to the standard width between the rails of a tractor vehicle.

The fifth wheel coupler 20 represents a conventional system, with a plate 46 hinged to the frame 18 by means of a bracket 48. The plate 46 is formed with an open slot 50 for receiving the king pin 36.

By progressively inspecting FIGS. 1 and 3, it can be appreciated that the tractor unit 12 can be easily converted into the flatbed truck 10. Accordingly, the folding crane 22 is used to raise the flatbed unit 16 above the frame 18, as shown in FIG. 1. Then the flatbed unit 16 is mounted on the fifth wheel coupler 20. In this manner, the king pin 36 is slid into the open slot 50, such that the shim blocks come to rest on the frame 18, with guide plates 30 contacting the outer sides of frame 18. Thus, the flatbed truck 10 can easily be converted, such that the tractor unit 12 can be used with various types of trailers.

Figure 6:
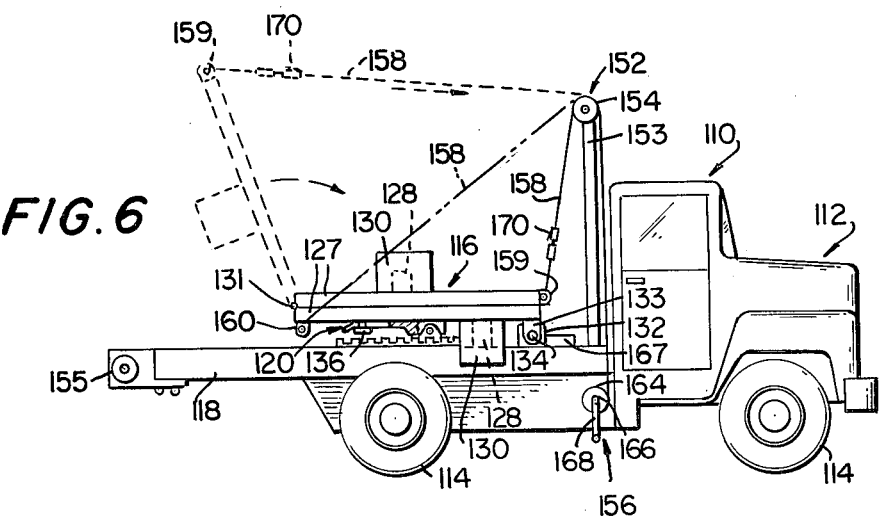
FIG. 6 is a side elevational view similar to FIG. 5, with the flatbed unit shown in a initial folded position by the solid lines and in a partially folded position by the broken lines.
Figure 7:
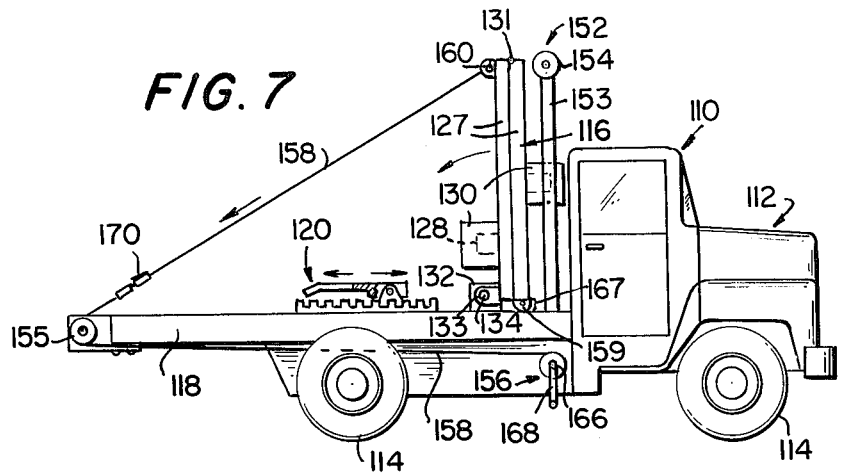
FIG. 7 is a side elevational view similar to FIG. 6, with the flatbed unit shown in a fully folded position for storage and with the pulley system engaged for unfolding the flatbed unit.

In FIGS. 5, 6 and 7, there is illustrated a further embodiment of the invention in which corresponding parts have been designated by the same reference numerals as part of a "100" series. Accordingly, there is provided a convertible flatbed truck 110 which includes a tractor unit 112, supported by wheels 114, and a flatbed unit 116. The tractor unit 112 has a frame 118 on which there is mounted a fifth wheel 120. In the flatbed truck 110, the flatbed unit 116, is comprised of two flatbed sections 127 with corresponding shim blocks 128 and guide plates 130. The flatbed sections 127 are coupled together by means of hinges 131. Mounted at forward flatbed section 127, on two brackets 132, is a pair of pivot arms 133 which are hinged to the frame 118 by means of a pair of removable pins 134. A king pin 136 is secured to the bottom of the forward bed section 127.

The remaining components of the fifth wheel coupler 120, which are substantially the same as coupler 20, will not be described in detail. However, in accordance with the flatbed truck 110, it is contemplated that the fifth wheel coupler 120 will be a conventional moving type coupler, as opposed to the fixed coupler 20, thereby allowing for forward and rearward movement of coupler 120 on tracks 121, as indicated by the directional arrows of FIG. 7.

In the flatbed truck 110, the folding crane 22 is replaced by a pulley system 152 which is mounted on a rack 153. The pulley system 152 includes a pair of top pulley wheels 154 journaled on opposite sides of the rack 153, a pair of idler pulley wheels 155 journaled on opposite sides of frame 118, and a pair of bottom pulley reels 156 mounted below the frame 118. A pair of cables 158 can be secured to the outer ends of the flatbed sections 127 by means of hooks 159 and 160, such that the cables 158 can be trained over the pulley wheels 154 and wound onto reels 156. The cables 158 are shown by the solid lines of FIG. 5, prior to the folding of the flatbed sections 127 and by the broken lines of FIG. 6, during the folding of the rearward flatbed section 127. The reels 156 consist of two spools 164 on opposite sides of the frame 118 which are fixed on a rod 166, passing through frame 118 and journaled for rotation thereon. Crank arms 168 are fixed to either end of rod 166, thereby allowing either one or two individuals to rotate the rod 166 and spools 164, in order to operate the pulley system 152. A pair of stop brackets 167 are mounted on frame 118 adjacent the brackets 132.

By progressively inspecting FIGS. 5, 6 and 7, the conversion to and from flatbed operation of the tractor 112 can be more fully appreciated. The first step in removing the flatbed unit 116 consists of releasing the fifth wheel lock and sliding the coupler 120 forward, completely out of engagement with the flatbed unit 116. In this manner, the king pin 136, as shown in FIG. 6, is disengaged from coupler 120, to allow for free swinging movement of the flatbed unit 116. The cables 158 are then attached to the hooks 159, as shown by the solid line view of cable 158 in FIG. 5 and the broken line view of cable 158 in FIG. 6. It is then possible to rotate crank arms 168 in a clockwise direction until the rearward flatbed section 127 is brought into the folded position, as shown in FIG. 6 by both the broken and solid line representations of rearward flatbed section 127. The cables 158 are then disengaged from the hooks 159 and connected to hooks 160, thereby allowing for further rotation of the pulley system 152, until the flatbed sections are swung into the fully folded position against stop bracket 168, as shown in FIG. 7. The cables 158 are maintained in engagement with hooks 160, with the flatbed sections 127 secured against stop brackets 167, such that the flatbed unit 116 can be maintained in the fully folded position by means of a conventional locking mechanism provided in connection with the spools 164.

To place the flatbed sections 127 in an operative position from the fully folded position, the locking mechanism of the spools 164 is released, and the cables 158 are trained over idler pulley wheels 155 and again connected to hooks 160. Then the cranks 168 are rotated in a clockwise direction until the flatbed units 127 have become partially unfolded, as shown by the solid line representation of flatbed sections 127 in FIG. 6. The cables 158 are then disengaged from the hooks 160 and connected to hooks 159 as respectively shown in FIG. 6 by the broken and solid line representations of the cables 158. The fifth wheel coupler 120 is then slid rearwardly in locking engagement with the king pin 136. By again rotating the pulley reels 156 in a clockwise direction, the rearward flatbed section 127 is partially unfolded to a position which would allow the operator to continue to manually unfold the rearward flatbed section 127. In this manner, the flatbed sections 127 are unfolded to the position shown in FIG. 5. It should be noted that due to the height of the rack 153, the rearward flatbed section 127 may only become partially unfolded, even when the cables 158 have been wound to the limit. However, once the rearward flatbed sections 127 have been partially unfolded, the cables 158 can be released from hooks 159 and the rearward flatbed section 127 can easily be folded into position either by hand operation or by gravity through the weight of the rearward flatbed section 127. This can be accomplished by engaging the locking mechanism of the spool 164 to secure the rearward flatbed section 127 in the partially unfolded position. A quick release connection 170 is located substantially at the end of cable 158 to allow the operator to release the rearward flatbed section 127 from the locked engagement of pulley spool 164. The removable pins 134 are provided to completely disengage the flatbed sections 127 from pivot arms 133, such that the tractor unit 110 can be operated without the flatbed sections 127, should this type of operation be necessary.

It can be appreciated that in accordance with the present invention, there has been provided a convertible flatbed truck 10, 110 which is capable of operation either as a flatbed truck or as a semi-trailer truck. Accordingly, the flatbed unit 16, 116 can be placed into and out of engagement with the fifth wheel coupler 20, 120, and stored when not in use.

A latitude of modification, change, and substitution is intended in the foregoing disclosure, and, in some instances, some features of the invention will be employed without corresponding use of other features. Accordingly, it is appropriate that the appended claims be construed broadly and in a manner consistent with the spirit and scope of the invention herein.

What is claimed is:

1. A convertible vehicle comprising a wheel supported tractor capable of interconnection with a flatbed unit formed from a unitary slab, means pivotally mounting said flatbed to said tractor, a fifth wheel coupler formed with a slot and mounted on said tractor, a pin mounted underneath said unitary slab for removably securing said flatbed unit to said tractor, such that said pin can be received in said slot for connecting and disconnecting said flatbed unit from said coupler, and crane means mounted on said tractor for placing said flatbed unit over said fifth wheel coupler in an operative position on said tractor and pivoting said flatbed unit to a stored out-of-the-way position on said tractor, whereby said vehicle can be converted into either a flatbed truck or a semi-trailer truck.

2. A convertible vehicle accordito allow for unencumbered use of said vehicle.

3. A convertible vehicle according to claim 1 in which said fifth wheel unit is slidably mounted on said tractor for movement into and out of engagement with said pin.

4. A convertible vehicle comprising a wheel supported tractor capable of interconnection with a flatbed unit, a fifth wheel coupler formed with a slot and mounted on said tractor, a pin mounted on said flatbed unit, such that said pin can be received in said slot for connecting and disconnecting said flatbed unit from said coupler, said flatbed unit including two flat bed sections, means connecting said flatbed sections for folding movement, and hinge means connecting one of said flatbed units to said trailer unit, such that after disengagement of said fifth wheel unit, said flat bed sections are capable of being folded together and pivoted into a stored position on said tractor whereby said vehicle can be converted into either a flatbed truck or a semi-trailer truck.

5. A convertible vehicle according to claim 4 in which a pulley system is mounted on said tractor for moving said flat bed sections in and out of said stored position.

6. A convertible vehicle according to claim 5 in which said pulley system includes, a rack post mounted on said trailer, a pair of primary pulley wheels journaled on said rack, a pair of pulley reels journaled on said frame below said pulley wheels, hook means on said flatbed sections, and a pair of cables removably attached to said hook means that are trained over said pulley wheels and wound onto said pulley reels, such that said pulley reels are capable of raising and lowering said flatbed sections into and out of position for engagement with said fifth wheel.

7. A convertible vehicle according to claim 6 in which a pair of idler pulley wheels are journaled on said frame in a position spaced apart from said pulley reels, such that said cables can be removed from said primary pulley wheels and trained over said idler pulley reels for unfolding said flatbed section into position for engagement with said fifth wheel.

* * * * *